US012723915B2

(12) United States Patent
Otto et al.

(10) Patent No.: US 12,723,915 B2
(45) Date of Patent: Sep. 1, 2026

(54) SPECTROMETER, DISTANCE MEASURING SYSTEM, AND METHOD FOR OPERATING A SPECTROMETER

(71) Applicant: MICRO-EPSILON Optronic GmbH, Langebrueck (DE)

(72) Inventors: Tobias Otto, Langebrueck (DE); Alexander Haussmann, Hoerlitz (DE); Christoph Grueber, Dresden (DE)

(73) Assignee: MICRO-EPSILON Optronic GmbH, Langebrueck (DE)

( * ) Notice: Subject to any disclaimer, the term of this patent is extended or adjusted under 35 U.S.C. 154(b) by 845 days.

(21) Appl. No.: 18/040,539

(22) PCT Filed: Mar. 22, 2022

(86) PCT No.: PCT/DE2022/200054
§ 371 (c)(1),
(2) Date: Feb. 3, 2023

(87) PCT Pub. No.: WO2023/051877
PCT Pub. Date: Apr. 6, 2023

(65) Prior Publication Data

US 2024/0255348 A1 Aug. 1, 2024

(30) Foreign Application Priority Data

Sep. 30, 2021 (DE) ..................... 10 2021 211 046.0

(51) Int. Cl.
*G01J 3/02* (2006.01)
*G01B 11/02* (2006.01)
*G01J 3/28* (2006.01)

(52) U.S. Cl.
CPC .......... *G01J 3/0208* (2013.01); *G01B 11/026* (2013.01); *G01J 3/2823* (2013.01)

(58) Field of Classification Search
CPC ...... G01J 3/0208; G01J 3/2823; G01J 3/0256; G01J 3/18; G01B 11/026; G01B 2210/50; G01B 11/0608
See application file for complete search history.

(56) References Cited

U.S. PATENT DOCUMENTS 5,329,353 A 7/1994 Ichimura et al.
6,757,113 B1 6/2004 Basavanhally et al.
(Continued)

FOREIGN PATENT DOCUMENTS

DE 102017122689 A1 4/2019
JP H05231938 A 9/1993
(Continued)

OTHER PUBLICATIONS

International Preliminary Report on Patentability and Written Opinion for International Application No. PCT/DE2022/200054 dated Apr. 2, 2024, 7 pages.

(Continued)

*Primary Examiner* — Michael E Teitelbaum
(74) *Attorney, Agent, or Firm* — Seed Intellectual Property

(57) ABSTRACT

A spectrometer with a lens, a dispersive element, and a detector, wherein a measuring light guided onto the lens is projected by way of the lens onto the dispersive element, is reflected back to the lens by the dispersive element in a spectrally dispersed manner, and is guided onto the detector by way of the lens, is designed and developed with regard to high performance given a compact structural size with structurally simple means such that the lens is a single lens or individual lens having at least one non-spherical surface for influencing the imaging. Furthermore, a corresponding distance measurement system and a corresponding method for operating a spectrometer are specified.

14 Claims, 2 Drawing Sheets

(56) References Cited

U.S. PATENT DOCUMENTS

| | | | | |
|---|---|---|---|---|
| 7,817,274 | B2 | 10/2010 | Zhang | |
| 9,964,443 | B1 | 5/2018 | Mitchell | |
| 2005/0073680 | A1 | 4/2005 | Chrisp et al. | |
| 2006/0038994 | A1 * | 2/2006 | Chrisp | G01J 3/18<br>356/328 |
| 2010/0130246 | A1 | 5/2010 | Biertümpfel et al. | |
| 2014/0233029 | A1 * | 8/2014 | Dobschal | G01J 3/0205<br>356/328 |
| 2018/0094975 | A1 * | 4/2018 | Marsaut | G01J 3/0286 |

FOREIGN PATENT DOCUMENTS

| | | | |
|---|---|---|---|
| JP | 2013525838 | A | 6/2013 |
| JP | 2015532713 | A | 11/2015 |

OTHER PUBLICATIONS

Notification of Reasons for Refusal for Japanese Patent Application No. 2022-564612, dated Nov. 14, 2023 (10 pages).

International Search Report and Written Opinion for International Patent Application No. PCT/DE2022/200054, dated Jun. 2, 2022 (8 pages).

Korean Patent Office Action for Korean Application No. 10-2023-7005316 with English Translation, mailing date Nov. 12, 2024, 12 pages.

* cited by examiner

Fig. 1
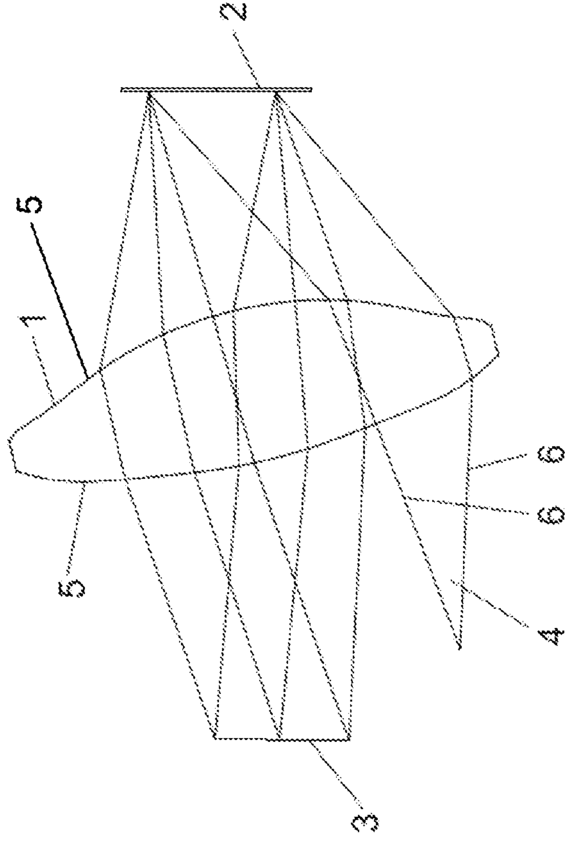

SPECTROMETER, DISTANCE MEASURING SYSTEM, AND METHOD FOR OPERATING A SPECTROMETER

BACKGROUND

Technical Field

The disclosure relates to a spectrometer having a lens, a dispersive element, and a detector, wherein a measuring light guided onto the lens is projected onto the dispersive element by way of the lens, is reflected back to the lens by the dispersive element in a spectrally dispersed manner, and is guided onto the detector by way of the lens.

Furthermore, the present disclosure relates to a distance measurement system, in particular a confocal chromatic distance measurement system, having such a spectrometer.

Furthermore, the present disclosure relates to a method for operating such a spectrometer, wherein the spectrometer comprises a lens, a dispersive element, and a detector, wherein a measuring light guided onto the lens is projected onto the dispersive element by way of the lens, is reflected back to the lens by the dispersive element in a spectrally dispersed manner, and is guided onto the detector by way of the lens.

Description of the Related Art

The performance of, for example, a confocal chromatic distance measurement system depends decisively on its resolving power and the measurement speed that can be realized with it. One important method is one-dimensional confocal chromatic distance measurement by way of appropriate optical sensors. White light is hereby projected onto a surface using optics. The optics are hereby not chromatically corrected; rather, they are designed so that an unambiguous longitudinal chromatic error results along the measurement axis. This results in that a maximum in the spectrum of the measuring light reflected by the sample develops at a wavelength that can be unambiguously associated with a distance between sample and measuring head. Serving as an evaluation unit of corresponding distance measuring systems or sensors are a spectrometer that, for example, has two converging lenses; a dispersive element; and a detector, wherein a measuring light guided onto the first of the two lenses is projected onto the dispersive element by means of this lens, spectrally dispersed by the dispersive element, and guided onto the detector by means of the second lens.

For some fields of use, it is desirable to markedly reduce the dimensions of such a spectrometer, and therewith ultimately of a corresponding distance measurement system or sensor, without thereby needing to accept performance losses relative to current systems. The performance of a spectrometer results from the sensitivity and the spectral resolving power.

The sensitivity requirement is justified in that distance metrology nowadays requires ever higher measurement rates. However, since the quantum efficiency of detectors is finite, the measurement signal to be evaluated must have a minimum light intensity. On the one hand, this can be achieved by intensifying the illumination beam, but this is only possible to a limited extent with available optical radiation sources of corresponding longevity and robustness. Another approach to be followed here is an optimization taking into account the light intensity, in order to be able to evaluate even weaker signals sufficiently well.

BRIEF SUMMARY AND GENERAL DESCRIPTION

The present disclosure is based on the object of specifying a spectrometer, a distance measuring system, and a method for operating a spectrometer, according to which high performance given a compact size is made possible with structurally simple means.

According to the disclosure, the preceding object is achieved by a spectrometer, a distance measuring system, and a method for operating a spectrometer as described herein.

Accordingly, in various embodiments, the spectrometer is designed and developed such that the lens is a single lens or individual lens having at least one non-spherical surface for influencing the imaging.

According to various embodiments, the method is designed and further developed such that a single lens or individual lens having at least one non-spherical surface is used as the lens for influencing the imaging.

In a manner according to the disclosure, it has first been recognized that the preceding object is achieved in a surprisingly simple manner by a clever design of the lens. In a further manner according to the disclosure, the lens is specifically designed with at least one non-spherical surface for simple influencing of the imaging. Due to the at least one non-spherical surface of the lens, it is possible to realize a compact spectrometer with only a single lens or an individual lens element, wherein a high imaging performance is possible with only a single lens despite a compact design and structurally simple design. Advantageously, the spectrometer according to the disclosure uses only very few optically influencing components with the single lens, the dispersive element, and the detector, which makes the thermal behavior of the spectrometer easily manageable.

Consequently, with the spectrometer according to the disclosure, the distance measuring system according to the disclosure, and the method according to the disclosure, a spectrometer, a distance measuring system, as well as a method are provided according to which high performance given compact size is enabled with structurally simple means.

At this point, it is noted that the term "single lens" or "individual lens" is understood to mean an individual lens element, such that in this document the term "single lens" or "individual lens" includes not only an individual, one-piece lens, but rather also a multi-piece lens element with, for example, a doublet or triplet arrangement or with two free-forms and/or aspheres fixed to or cemented to one another.

In an advantageous exemplary embodiment, the non-spherical surface can comprise a preferably rotationally symmetrical aspherical surface, free-form surface, or zone-dependent diffractive structure. Depending on the use case and individual requirements, a suitable embodiment can be selected in a flexible manner, and a desired performance of the spectrometer can be realized in a simple manner.

The lens can very advantageously provide optical functions in separate zones of the lens. The lens can inasmuch be used for different functions without it being necessary to provide individual different lenses for different functions. This significantly simplifies the design of the spectrometer.

In another advantageous exemplary embodiment, the optical functions of collimation and refocusing may be for the measuring light.

In particular, given such an exemplary embodiment, the influencing of the imaging can comprise the correction of imaging errors, wherein preferably wavelength-specific correction can take place for the spectrally dispersed measuring light in order to enable an optimization of the two functions of collimation and refocusing. A particularly high, wavelength-optimized performance is hereby achieved with the spectrometer.

With respect to particularly high performance and low power loss given higher line counts, the dispersive element can have a preferably flat reflection grating. Such a flat reflection grating can be fabricated easily, reproducibly, and inexpensively, and exhibits a manageable linear response to temperature effects.

In another exemplary embodiment, the lens can be designed to be refractive, diffractive, or hybrid—for example, diffractive structure on free-form support. The selection of the lens design can be made flexibly under consideration of the specific use case.

With regard to high performance of the spectrometer, the lens can be produced by blank pressing, preferably precision blank pressing, or injection molding, preferably plastic injection molding. In particular with a blank press or precision blank press, it is possible to produce lenses with complex free-form surfaces reproducibly and with high quality, even in larger quantities.

In another advantageous exemplary embodiment, an arrangement of an entrance aperture for the measuring light can be selected such that the measuring light is obliquely incident on the dispersive element and is reflected approximately perpendicularly from the dispersive element, such that an enlargement of an opening arises in the spectral direction, which reduces an imaging scale on the detector in the spectral direction. The spectrometer can hereby achieve a higher spectral resolution given the same light sensitivity or, conversely, can capture more light given the same spectral resolution, and thus become more light sensitive.

In a structurally simple manner, the detector can—flexibly, depending on the use case—have image elements arranged in a line or in a matrix.

Exemplary embodiments of the spectrometer according to the disclosure may have the following advantageous features:

In principle, exemplary embodiments of the spectrometer according to the disclosure, as an essential subcomponent of, for example, a distance measurement system, may be optimized for the two parameters of resolving power and measurement speed under the condition of an optimally compact size.

Due to its compact design, the spectrometer according to the disclosure can in principle also be designated as a compact spectrometer.

One exemplary embodiment of a spectrometer of the disclosure can have a double pass arrangement similar to a Littrow spectrometer. The exemplary embodiment can thereby include the following components:

a) an aperture or entrance aperture which is arbitrarily arranged—top, bottom, left, right—around the receiving element or the detector.

b) a lens element or a lens having at least one non-spherical surface, which enables a wavelength-dependent correction of the imaging power by using the optical surface in different lateral zones.

c) a planar or flat reflection grating.

d) a receiving element or a detector on which the spectral components of the incident light or measuring light are focused and which evaluates their intensities.

e) preferably, a support structure which enables the integration of all optical and electronic elements.

The lens element or lens used can thereby be designed in such a way that:

a) it is or they are designed to be either refractive, diffractive, or hybrid.

b) it can be or they can be produced by a replicating process.

c) the shape of the non-spherical surface explicitly has an aspherical or a free-form surface, or a zone-dependent diffractive structure.

d) the lens element or the lens can be trimmed, or directly pressed or injection-molded as a cuboid, in the replicating process.

The arrangement of the entrance aperture can preferably be selected in such a way that it leads to an oblique irradiation of the measuring light and to an approximately perpendicular emergence from the grating, such that it leads to an enlargement of the opening in the spectral direction, which reduces the imaging scale on the receiving element in the spectral direction.

The center plane of the lens element can be in a range of 25% to 75% of the distance between grating and detector.

The receiving element used can thereby be a row or matrix element or have rows, multiple rows, or a matrix.

The support structure can thereby be designed in such a way that it enables a quasi-ideal thermally compensated arrangement and fixing of the components.

To estimate the performance of exemplary embodiments of the spectrometer according to the disclosure, a market analysis was conducted. A quality criterion Q was hereby calculated, which criterion describes the performance for a given minimum displayable spectral range according to the following relationship:

$$Q = \frac{\text{Light quantity}}{\text{Spectral resolution}} = \frac{NA \times \text{Slit width}}{\text{Spectral resolution}}$$

Here, NA stands for the numerical aperture of the entrance beam. The slit width results from the entrance aperture or the core diameter of the incident fiber, and the spectral resolution shows which spectral width can still be evaluated separately at the image sensor.

It was conspicuous that the investigated spectrometers that were available on the market had either too large a structural form or an insufficient performance. In the following table, the last two models, "MEO, double asphere" and "MEO, free-form surface", are exemplary embodiments of the present disclosure. The exemplary embodiment "MEO, double asphere" thereby corresponds approximately to the quality criterion of the current spectrometer of the applicant, which, however, has markedly larger dimensions.

| Vendor/model | Size | Volume | Spectral resolution | Aperture/ slit width | NA | Quality criterion Q |
|---|---|---|---|---|---|---|
| Competitor 1 | 22 × 22 × 9 $mm^3$ | 4.4 $cm^3$ | 10.0 nm | 35 μm | 0.22 | 770 |
| Competitor 2 | 35 × 22 × 13.5 $mm^3$ | 10.4 $cm^3$ | 5.0 nm | 50 μm | 0.18 | 1820 |
| Competitor 3 | 64 × 42 × 14.5 $mm^3$ | 39.0 $cm^3$ | 2.5 nm | 35 μm | 0.10 | 1400 |
| MEO, double asphere | 45 × 30 × 12.5 $mm^3$ | 16.9 $cm^3$ | 1.7 nm | 30 μm | 0.20 | 3000 |
| MEO, free-form lens | 45 × 30 × 12.5 $mm^3$ | 16.9 $cm^3$ | 1.1 nm | 30 μm | 0.20 | 5400 |

BRIEF DESCRIPTION OF THE SEVERAL VIEWS OF THE DRAWINGS

There are various possibilities for designing and developing the teaching of the present disclosure in an advantageous manner. In this regard, with the aid of the drawings reference is made, on the one hand, to the subordinate claims and, on the other hand, to the following explanation of preferred exemplary embodiments of the disclosure. In conjunction with the illustration of the preferred exemplary embodiments of the disclosure on the basis of the drawing, generally preferred embodiments and developments of the teaching are also illustrated. The following are shown in the drawings:

FIG. 1 in a schematic presentation, the design of a first exemplary embodiment of the spectrometer according to the disclosure, and FIG. 2 in a schematic presentation, the design of a second exemplary embodiment of the spectrometer according to the disclosure.

DETAILED DESCRIPTION

Figure 2:
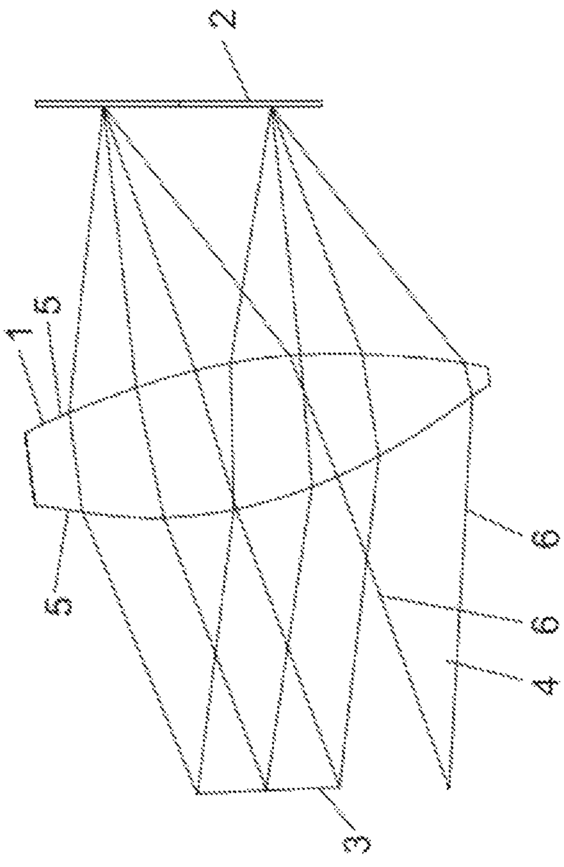

FIG. 1 shows, in a schematic presentation, the design of a first exemplary embodiment of the spectrometer according to the disclosure, wherein the spectrometer comprises a lens 1, a dispersive element 2 in the form of a flat reflection grating, and a detector 3 with a scan line. A measuring light 4 guided onto the lens 1 is projected onto the dispersive element 2 by way of the lens 1, is reflected back to the lens 1 by the dispersive element 2 in a spectrally dispersed manner, and is guided onto the detector 3 by way of the lens 1. The dispersive element 2 is located at a suitable, predeterminable distance from the lens 1. With regard to high performance given compact structural size with structurally simple means, the lens 1 is a single lens or individual lens with at least one non-spherical surface 5—here, a double asphere with two non-spherical surfaces 5—for influencing an imaging, in particular for correcting imaging errors.

In principle, the exemplary embodiment shown in FIG. 2 corresponds to the exemplary embodiment shown in FIG. 1, wherein, in contrast to the exemplary embodiment shown in FIG. 1, the lens 1 is a single lens or individual lens with a free-form surface 5—on the left in FIG. 2—and with an aspherical surface 5—on the right in FIG. 2—facing toward the dispersive element 2.

Given both exemplary embodiments, the measuring light 4 is guided onto the lens 1 through an entrance aperture (not shown here), wherein only two edge beams 6 of the measuring light 4 are shown for clarity.

In order to spectrally disperse light according to the usual concept, it must initially be directed onto a dispersive element in a well-collimated manner. The spectral splitting—angular dispersion—that is hereby produced is then converted by focusing optics into a local dispersion in the image plane in which the line detector is located.

In order to create a compact spectrometer, it is prior art to fold the beam in the spectrometer. The dispersive element is particularly suitable for this purpose, since it is centered in the optical arrangement. Structural forms are the prism, the transmission grating, and the reflection grating. The prism has the disadvantage of limited angular dispersion and unfavorable structural size. At higher line numbers, the reflection grating is characterized by very low power loss compared to the transmission grating. In general, a high angular dispersion enables a shorter focusing focal length given the same local splitting on the detector element. At the same time, however, the demands on the imaging system increase if the opening of the spectrometer may not be reduced to maintain sensitivity.

The spectrometer according to the disclosure is similar to the principle of the Littrow spectrometer. In one embodiment with a lens, this consists of only one lens which is both collimating optics for the incident beam and focusing optics for the imaging of the spectrum on the detector line. Likewise, a flat grating finds its application as a dispersive element. In addition, given a Littrow spectrometer, for one wavelength—preferably centered in the desired spectral range—the angle of incidence is equal to the angle of diffraction, such that in this instance the field angle-dependent imaging errors are distributed symmetrically around the optically almost ideally correctable central wavelength. In reality, however, light source and imaging element always have a design-dependent minimum distance, on the one hand due to the required separation of incident and emergent beams, and on the other hand also due to the required local splitting. If the light source and the imaging element are arranged horizontally atop one another, minor losses in resolution can be expected. However, given a correspondingly large local splitting and opening of the spectrometer, the resulting imaging errors cannot be controlled with a simple, spherical lens. The solution of a multi-lens objective is also known for this purpose; see U.S. Pat. No. 9,964,443 B1. However, the decisive disadvantage are the costs associated herewith, the high adjustment effort, and the expected greater difficulties with thermal compensation.

However, due to further developed production processes, e.g., precision blank pressing, it is by now possible to reproducibly produce lenses with complex free-form surfaces, even in larger quantities. The disclosure takes advantage of this to produce a new type of spectrometer with complex optical surface profiles—aspheres, free-forms, diffractive structures.

The obtained measuring light 4 is cast onto a single lens 1 via an entrance aperture (not shown here) in a divergent free beam with center and edge beams 6; see FIGS. 1 and 2. This is collimated by lens 1 and projected onto a dispersive element 2 in the form of a flat reflection grating. The reflection grating reflects the spectrally dispersed light pencil back to the same single lens 1, which in turn directs the light pencils in a wavelength-separated manner onto the scan line of the detector 3. The disclosure is hereby characterized by at least one non-spherical surface 5 or rotationally symmetric asphere—or, optimally, free-form surface—which corrects for the imaging errors that arise due to the relatively large field angles. Via the disclosure, it is possible to obtain a precisely matching, wavelength-specific correction of the spectrally dispersed light pencil in that, in a lens 1, the two functions of collimation and refocusing are optimized in separate zones of the lens 1.

The shape of the aperture is hereby irrelevant. In the event that the line pixels are square, this is ideally circular, such as the end of an optical waveguide. If, on the other hand, the pixels are rectangular, a slit aperture situated perpendicular to the line can be advantageous in order to optimize the light yield.

The production of complex free-form surfaces can be achieved, for example, via precision blank pressing. This is a highly precise and at the same time economical forming process for glass lenses. In contrast to the known plastic injection lenses, glass lenses have markedly lower temperature effects, fewer points of interference in the material, and greater long-term stability. However, production by plastic injection molding is nevertheless conceivable.

Only via the at least one non-spherical surface—for lower resolution requirements, an asphere is also sufficient—is it possible to implement a resolution-optimized correction given the space-saving arrangement of light source and detector line, whereby a high imaging performance is possible despite a compact design.

Via the freedom of shaping the lens surface, it is possible to adjust the image scale within the range of what is possible, such that a reduced image of the source is imaged on the line detector. The spectrometer can hereby achieve a higher spectral resolution given the same light sensitivity or, conversely, capture more light given the same spectral resolution, and thus become more light sensitive.

The flat grating has the advantage that it can be produced easily, reproducibly, and inexpensively, and also has a manageable, linear behavior under the influence of temperature.

As a whole, in an exemplary embodiment of this type of spectrometer, the thermal behavior is manageable within limits, since:

1. only four optically influencing components (aperture, lens, grating, line detector) are used,
2. there are only short distances between the optical components, and
3. no multi-part lens systems made of metal-glass combinations are used.

Advantages of Components of Exemplary Embodiments:

Single Lens with Free-Form Surface Vs. Doublet Lens or Lens System:

The idea of developing a spectrometer with a single lens with a free-form surface has various aspects:

1. Given at least the same optical performance, a significantly more compact structural form—by approximately a factor of 3—is possible.
2. The combination of two spherical lenses in the form of a doublet lens would not achieve the required imaging performance, since a correction for the field angles varying strongly with wavelength (high angular dispersion) is—in contrast to free-form optics—not hereby possible.
3. The thermal influences on the optical properties of an individual lens are markedly more manageable than those on a lens system, since the influences of material stresses and expansion coefficients only have a single effect and do not mutually influence each other in an uncontrolled manner. In addition, potentially problematic components such as lens putty and objective housings are absent.
4. Given the current prior art, precision blank pressing now enables an economical production with a high quality at a reasonable cost.

Planar Grating Vs. Concave Grating:

The advantage of the planar grating is the procurement of this mass product. It is inexpensive and available on the market as a catalog product in a wide range of variants. A concave grating is always a custom-made product because focal length, line width, and line arrangement are too many variables for a suitable catalog product. In addition, the production process is markedly more complex, as each grating must be molded individually.

The thermal behavior of a planar grating is likewise less complex than that of a concave grating. Only the line spacing and the line depth may vary. Both lead to predictable behavior that can be compensated for in the design or, if necessary, corrected by calibration. Given the concave grating, by contrast, the focal length would also vary with the temperature, which generally has a negative effect on the imaging quality on the line, multiple line, or image matrix.

Classification in the Prior Art:

The invented spectrometer is technically similar to a Littrow spectrometer, and at the same time has to exhibit properties of a Dyson spectrometer.

Littrow Spectrometer:

According to Wikipedia, a Littrow spectrometer is a spectrometer with only one focusing optic that acts simultaneously as both a collimator for the incident light and as objective for the light reflected from the dispersive element. This arrangement was devised by Otto von Littrow (1843-1864). Such an arrangement is referred to as an autocollimation arrangement. For this purpose, the dispersive element must reflect the light, separated by wavelength, back in the direction of incidence, which can only be fulfilled exactly for one wavelength. Both a reflection grating and a prism or transmission grating in front of a plane mirror are possible as a dispersive element. A reflection grating must be rotated such that the diffraction order that is to be observed is reflected back against the direction of incidence. Blazed gratings with a correctly selected blaze angle are particularly suitable for use in Littrow spectrometers. So that the reflected light can be detected, an entrance slit and detector are offset from one another perpendicular to the direction of dispersion.

Although, at first glance, the spectrometer according to the disclosure is very similar to the Littrow spectrometer with its lens used in the double pass, there is a decisive difference. In a Littrow spectrometer, the principle of autocollimation is used in that the angle of incidence into the lens collimating on the outward path is equal to the angle of emergence out of the lens focusing on the return path. The spatial separation of entrance slit and detector must be perpendicular to the direction of dispersion (both are "on top of one another" in plan view) in order to not incur any noteworthy degradation of the imaging. Given the present disclosure, the additional degrees of freedom of the aspherical or, even better, free-form surface enable the lens regions responsible for collimation and focusing to be optimized independently of one another, within limits. Thus, the disclosure does not use the principle of autocollimation.

Dyson Spectrometer:

The Dyson spectrometer is a single-lens spectrometer with concave reflection grating with the distinctive feature that the lens surface facing toward the grating is shaped and positioned concentrically with respect to the grating curvature. The entrance aperture is ideally situated in the optical axis, in reality as close to it as possible. The Dyson spectrometer is used in particular for hyperspectral imaging, since the grating and lens surfaces, which are executed concentric to one another, compensate for imaging errors to the greatest possible extent.

The special potential of the Dyson spectrometer is to spectrally disperse not only a light spot, but a line. However, this property is not required for the posed object. The large spatial extent of the spectrometer—in particular in the vertical plane, which is not necessary for the one-dimensional point—is even disadvantageous. Another disadvantage is the costly concave grating—in contrast to the flat grating of the present disclosure—which must additionally be positioned with great precision relative to the lens in order to meet the requirement for concentricity of grating and rear lens surface. Here, the tolerances of the production of two different optical elements exponentiate with those of the mutual positioning.

Compact Spectrometer According to U.S. Pat. No. 7,817,274 B2:

A multitude of spectrometer arrangements with the objective of a compact design are known from U.S. Pat. No. 7,817,274 B2. The embodiment shown in FIG. 6(*b*) is thereby closest to the present disclosure. The core of this embodiment is a cylindrical lens between aperture and first lens, or on the return path between focusing lens and detector line, which hereby has a markedly lower structural height compared to the prior art.

The essential difference between this embodiment and the present disclosure is that, according to this embodiment, it is not a free-form lens but rather a spherical doublet that is used. As can be seen in FIG. 6(*b*) of U.S. Pat. No. 7,817,274 B2, the vertical distance to be achieved between entrance aperture and detector line is also hereby extremely small in order to not incur too great a reduction in imaging quality. In addition, the lens is also very close in front of the grating, whereas the lens of the present disclosure is in a range of 25 to 75% of the distance between grating and detector line.

In addition, in U.S. Pat. No. 7,817,274 B2 the entrance beam directly behind the entrance aperture is first "flattened" by the cylindrical lens before the doublet collimates it. Before hitting the line, the spectral lines are again compressed in height by the same lens. Here, the present disclosure differs in that the focal length is shortened by the free-form lens to such an extent that, in conjunction with the required local splitting, a system with flat aspect ratio already results.

With regard to further advantageous embodiments of the spectrometer according to the disclosure, the distance measuring system according to the disclosure, and the method according to the disclosure, reference is made to the general part of the specification and to the accompanying claims, in order to avoid repetition.

Finally, it is expressly noted that the exemplary embodiments described in the preceding serve only to explain the claimed teaching, but do not restrict it to the exemplary embodiments.

LIST OF REFERENCE SIGNS

- 1 Lens
- 2 Dispersive element
- 3 Detector
- 4 Measuring light
- 5 Non-spherical surface
- 6 Edge beam The various embodiments described above can be combined to provide further embodiments. All of the U.S. patents referred to in this specification are incorporated herein by reference, in their entirety. Aspects of the embodiments can be modified, if necessary, to employ concepts of the various patents to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A spectrometer with an entrance aperture, a lens, a dispersive element, and a detector, wherein the spectrometer has a double pass arrangement in which a measuring light guided onto the lens is projected onto the dispersive element by way of the lens, is reflected back to the lens by the dispersive element in a spectrally dispersed manner, and is guided onto the detector by way of the lens, wherein:

the lens is a single lens or individual lens for influencing an imaging onto the detector, the dispersive element has a planar reflection grating located at a distance from the lens, the single lens or individual lens comprises two non-spherical surfaces or a free-form surface and an aspherical surface, and the entrance aperture for the measuring light is arranged such that the measuring light is obliquely incident on the dispersive element and is reflected approximately perpendicularly from the dispersive element so that an enlargement of an opening in a spectral direction is created that reduces an imaging scale on the detector in the spectral direction.

2. The spectrometer according to claim 1, wherein at least one of the two non-spherical surfaces has an aspherical surface, free-form surface, or zone-dependent diffractive structure in different zones of the lens.

3. The spectrometer according to claim 1, wherein the lens provides optical functions in separate zones of the lens.

4. The spectrometer according to claim 3, wherein the optical functions are collimation and refocusing for the measuring light.

5. The spectrometer according to claim 1, wherein the influencing of the imaging comprises a correction of imaging errors.

6. The spectrometer according to claim 1, wherein the lens is of refractive, diffractive, or hybrid design.

7. The spectrometer according to claim 1, wherein the lens is produced by a replicating process that includes blank pressing or injection molding.

8. The spectrometer according to claim 1, wherein the detector comprises image elements arranged in a line or in a matrix.

9. A distance measurement system, comprising a spectrometer according to claim 1.

10. A method for operating a spectrometer that has an entrance aperture, a lens, a dispersive element, and a detector, wherein the spectrometer has a double pass arrangement, the method comprising:

guiding a measuring light onto the lens, projecting the measuring light onto the dispersive element by way of the lens, reflecting the measuring light back to the lens by the dispersive element in a spectrally dispersed manner, and guiding the measuring light onto the detector by way of the lens, wherein:

a single lens or individual lens is used as the lens for influencing an imaging onto the detector, the dispersive element has a planar reflection grating located at a distance from the lens, the single lens or individual lens comprises two non-spherical surfaces or a free-form surface and an aspherical surface, and the entrance aperture for the measuring light is arranged such that the measuring light is obliquely incident on the dispersive element and is reflected approximately perpendicularly from the dispersive element so that an enlargement of an opening in a spectral direction is created that reduces an imaging scale on the detector in the spectral direction.

11. The spectrometer according to claim 2, wherein the aspherical surface, free-form surface, or zone-dependent diffractive structure is rotationally symmetrical.

12. The spectrometer according to claim 5, wherein the correction of imaging errors is a wavelength-specific correction for the spectrally dispersed measuring light.

13. The spectrometer according to claim 7, wherein the blank pressing is precision blank pressing, or the injection molding is plastic injection molding.

14. The distance measurement system of claim 9, wherein the distance measurement system is a confocal chromatic distance measurement system.

* * * * *